United States Patent Office 3,679,609
Patented July 25, 1972

3,679,609
CLEANING AND CONDITIONING CONCENTRATE COMPOSITIONS
Charles S. Castner, Reading, Pa., assignor to Schuyler Development Corporation
No Drawing. Filed July 28, 1969, Ser. No. 845,536
Int. Cl. C11d 3/066, 3/07
U.S. Cl. 252—527         7 Claims

ABSTRACT OF THE DISCLOSURE

A concentrate composition made up of lower alcohols 30–40 parts, a selected glycol 14–18 parts, methyl Cellosolve 7–11 parts, ammonia 3–6 parts, higher alcohols and ethers 2–4 parts, detergents 1.5 to 2.5 parts, a member from the group alkaline earth borates, pyro phosphates, ortho phosphates and ortho silicates 0.5 to 1.5 parts, ethylene diamine tetracetate 0.25 to 0.75 part, a member from the group sodium and potassium hydroxide 0.1 to 0.5 part and water 20 to 30 parts, and which by the serial addition of water and active agents, can be predictably altered to produce a variety of different compositions, all of which have exceptional ranges of water extendability with slight diminution of surfactant conditioning efficiency; and, therefore, serve as highly effective cleansers and conditioners for a variety of hard surface finished, soft goods, fibre and fabric materials.

---

This invention relates to cleaning and conditioning concentrate compositions and particularly to a composition which is highly effective in cleaning and conditioning various hard surfaces and soft ware and particularly in cleaning glass and keeping glass free of streaks and film as well as being a windshield anti-freeze solution, in cleaning various hard surfaces and conditioning soft goods, fibre and fabric materials.

There are many compositions presently available for cleaning various materials including glass. Many of these compositions are not effective in preventing post application freeze-up of base (aqueous) solutions when used in sub-zero weather and most are not successful in preventing subsequent streaking and film forming. On the contrary, one of the most common complaints heard about present day cleaning compositions particularly glass cleaners is the problem of avoiding streaking and film forming. This is particularly true in those compositions used for cleaning the windshields and rear view mirrors on automobiles and trucks.

The present invention overcomes these problems and provides a composition which may be used for cleaning and conditioning virtually any surface. Broadly stated the base composition of this invention consists of:

| | Parts |
|---|---|
| Lower alcohols | 30–40 |
| A member from the group consisting of hexyl glycol, di-ethylene glycol, ethylene glycol, and glycerol | 14–18 |
| Ethylene glycol monoethyl ether (methyl Cellosolve) | <15 |
| Ammonia (29° conc.) | 3–6 |
| Higher alcohols and ethers (e.g., diethylene glycol monoethyl ether) | 2–4 |
| Detergent e.g. (non-ionic Rohm & Haas) | 1.5–2.5 |
| Alkaline earth borates, pyro phosphates, ortho phosphates, ortho silicates | 0.5–2.5 |
| Ethylene diamine tetracetate | 0.25–0.75 |
| Sodium or potassium hydroxide | 0.10–0.50 |
| Water | 20–30 |

I have found that the foregoing formulation, if aerated by dripping, bubbling, air through the liquid solution or similar aeration procedures, has a phenomenal extendability. For example, the composition may be placed in a 16 oz. bottle, used down to the halfway mark, refilled and this cycle repeated at least 12 times without loss of efficiency. This surprising capability will not be efficiently extendable to the same limits if the mixture is simply agitated with a mechanical mixer but only if the mixture is aerated.

The lower alcohol which I prefer in this composition is isopropanol, however, methyl alcohol, ethyl alcohol and the like are usable but less desirable. For example, methanol and ethanol are more inflammable and methanol is more toxic and therefore less desirable.

Among the higher alcohols and ethers Carbitol (diethylene glycol monoethyl ether) is preferred.

The detergent composition may be a non-ionic, a cationic, an anionic, or a fatty acid detergent depending upon the purpose desired. For example, non-ionic detergents such as Rohm and Haas Triton X102 (octyl phenol reacted with 12–13 mols of ethylene oxide), and Triton X–100 (octyl phenol reacted with 9–10 mols of ethylene oxide), cationic detergents such as the alkyl ($C_9$ to $C_{15}$) tolylmethyltrimethylammonium chlorides Hyamines, Rohm & Haas X–3500 and X2389 or Drew Chemicals Drewstat and Drewspin, anionic detergents such as Atlantic Refining Ultra-Wet 60K, Dow Chemicals Dow Fax and Rohm and Haas LS 44 and LS 55, pine oil and fatty acids such as lauric, olive, palmitic, stearic, etc. all may be used in the composition. The special active agents may be alternatively and selectively methyl Cellosolve for window cleaning, pine oil and fatty acids for sudsing and floating away nonglass surface grease and particles, Hyamines for germicidal, sanitizing and deodorizing, Drewstat and similar cationic detergents for antistatic properties, and similar agents.

A preferred composition for glass cleaning consists essentially of:

| | Parts |
|---|---|
| Isopropanol | 35 |
| Hexyl glycol | 16 |
| Methyl Cellosolve | 9 |
| Ammonia (29° conc.) | 4.5 |
| Diethylene glycol monoethyl ether (e.g. Carbitol) | 3 |
| Atlantic 60K Ultrawet | 2 |
| Sodium tetra borate | 1 |
| Ethylene diamine tetracetate | 0.5 |
| Potassium hydroxide | 0.25 |
| Water | 28.75 |

A glass cleaner may, however, have the broader composition:

| | |
|---|---|
| Lower alcohols | 30–40 |
| A member from the group consisting of hexyl glycol diethylene glycol, ethylene glycol, and glycerol | 14–18 |
| Methyl Cellosolve | 7–11 |
| Ammonia (28° conc.) | 3–6 |
| Higher alcohols and ethers (e.g. Carbitol) | 2–4 |
| Detergent e.g. Triton X–102 (non-ionic R & H L555 e.g. anionic | 1.5–2.5 |
| Alkaline earth borates: pyro phosphates, ortho phosphates, ortho silicates | 0.5–2.5 |
| Ethylene diamine tetracetate | 0.25–0.75 |
| Sodium or potassium hydroxide | 0.10–0.50 |
| Water | 20–30 |

The foregoing composition is diluted for use as necessary. For example, for windshield cleaning at near-freezing temperatures, the foregoing composition is diluted 8 parts in 64 parts of water; for ordinary household window cleaning the foregoing composition is diluted 1 part in 100 parts of water. A preferred general dilution can be extended from 1 part in 60 parts water to one part in 1000 parts of water.

While I have set out certain preferred embodiments of my invention in the foregoing specification, it will be understood that this invention may be otherwise embodied within the scope of the following claims.

I claim:

1. A glass cleaning composition concentrate for aqueous dilution consisting essentially of isopropanl 35 parts, hexyl glycol 16 parts, ethylene glycol monomethyl ether 9 parts, ammonia (29° conc.) 9 parts, diethylene glycol monoethyl ether 3 parts, non-ionic detergent 2 parts, sodium tetra borate 1.0 part, ethylene diamine tetracetate 0.5 part, potassium hydroxide 0.25 part and water 28.75 parts.

2. A composition as claimed in claim 1 wherein sodium hydroxide is substituted for the potassium hydroxide.

3. A windshield anti-freeze and cleaning composition consisting essentially of the composition of claim 1 diluted by water in the ratio 8:64.

4. A glass cleaning composition consisting essentially of the composition of claim 1 diluted by water in the ratios from 1:64 to 1:1000.

5. A glass cleaning composition as claimed in claim 1 for base solution which has been aerated.

6. A composition as claimed in claim 1 having germicidal properties wherein the special active ingredient is minimal 5 parts alkyl ($C_9$ to $C_{15}$) tolylmethyltrimethylammonium chloride in solutions only where nonionic detergents are present.

7. A composition as claimed in claim 1 having antistatic properties additionally containing 0.5 to 3 parts of a cationic detergent.

References Cited

UNITED STATES PATENTS

| 3,117,113 | 1/1964 | Tudor | 252—8.75 X |
| 3,232,880 | 1/1966 | Mausner et al. | 252—137 |
| 3,281,367 | 10/1966 | Jones et al. | 252—112 |
| 3,393,154 | 7/1968 | Treitler | 252—137 |

OTHER REFERENCES

Gregory: Uses and Applications of Chemicals and Related Materials (1939), pp. 52, 112, 540, 541.

Sagarin: "Cosmetics, Science and Technology" (1966), p. 1021.

Levitt: Oils, Detergents, Maintenance, Specialties—vol. 2 (1967), p. 82.

Triton Surfactants, Rohm & Haas, Philadelphia, Pa. (1966), p. 4.

McCutcheon, Detergent and Emulsifiers, Morristown, N. J. (1969), pp. 86, 118, 261.

HERBERT B. GUYNN, Primary Examiner

W. SCHULZ, Assistant Examiner

U.S. Cl. X.R.

252—158, 523, 528, 541, Dig. 10

PO-1050
(5/69)

UNITED STATES PATENT OFFICE
CERTIFICATE OF CORRECTION

Patent No. 3,679,609         Dated July 25, 1972

Inventor(s) Charles S. Castner

It is certified that error appears in the above-identified patent and that said Letters Patent are hereby corrected as shown below:

Column 2, line 63, after "non-ionic" insert end of parenthesis.

Column 3, Claim 1, line 13, "isopropanl" should be --isopropanol--.

Under the heading OTHER REFERENCES, McCutcheon, Detergent and Emulsifiers, Morristown, N.J. (1969), pp. 86, 118, 261, "Detergent" should be --Detergents--; and pp. 118, should be --119--.

Signed and sealed this 26th day of December 1972.

(SEAL)
Attest:

EDWARD M. FLETCHER, JR.
Attesting Officer

ROBERT GOTTSCHALK
Commissioner of Patents